(12) United States Patent
Leske et al.

(10) Patent No.: US 11,146,413 B2
(45) Date of Patent: Oct. 12, 2021

(54) SYNCHRONOUS COMMUNICATION

(71) Applicant: Google LLC, Mountain View, CA (US)

(72) Inventors: Matthew J. Leske, Stockholm (SE); Loren Groves, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 329 days.

(21) Appl. No.: 15/486,395

(22) Filed: Apr. 13, 2017

(65) Prior Publication Data

US 2017/0222823 A1 Aug. 3, 2017

Related U.S. Application Data

(63) Continuation of application No. 14/105,938, filed on Dec. 13, 2013, now Pat. No. 9,628,538.

(51) Int. Cl.
*H04L 29/06* (2006.01)
*H04L 29/08* (2006.01)
(Continued)

(52) U.S. Cl.
CPC ......... *H04L 12/1822* (2013.01); *G06Q 50/01* (2013.01); *H04L 65/4076* (2013.01); *H04L 65/608* (2013.01); *H04L 67/1095* (2013.01); *H04N 7/15* (2013.01); *H04N 21/242* (2013.01); *H04N 21/4316* (2013.01); *H04N 21/47* (2013.01); *H04N 21/4788* (2013.01); *H04N 21/6125* (2013.01); *H04L 67/04* (2013.01); *H04L 67/14* (2013.01)

(58) Field of Classification Search
CPC ......... H04L 12/1822; H04L 2001/0093; H04L 65/1083; H04L 65/4076; H04L 65/608; H04L 67/04; H04L 67/14; H04L 67/1095; H04N 21/6125; H04N 21/2387; H04N 21/2393; H04N 21/242; H04N 21/2665; H04N 21/4788; H04N 21/6437; H04N 5/44591; H04N 7/15; H04N 21/4316; H04N 21/47; G06Q 50/01
See application file for complete search history.

(56) References Cited

U.S. PATENT DOCUMENTS 6,760,749 B1 7/2004 Dunlap et al.
7,949,116 B2 5/2011 Swanson
(Continued)

FOREIGN PATENT DOCUMENTS

WO 2012149796 A1 11/2012
WO 2013024397 A1 2/2013

OTHER PUBLICATIONS

Dougherty, J., "How to record & broadcast a video conference with Google+," Nov. 5, 2012, commons.trincoll.edu, pp. 1-2.
(Continued)

*Primary Examiner* — Kevin T Bates
*Assistant Examiner* — Ranjan Pant
(74) *Attorney, Agent, or Firm* — IP Spring

(57) ABSTRACT

A method and computing system for receiving, using one or more computing devices, a discrete video stream from each of a plurality of users of a social network, resulting in a plurality of discrete video streams. A synchronous communication session is provided for the plurality of users based, at least in part, upon the plurality of discrete video streams. The plurality of discrete video streams are broadcast to one or more broadcast recipients.

17 Claims, 4 Drawing Sheets

(51) Int. Cl.
*H04N 7/15* (2006.01)
*H04L 12/18* (2006.01)
*G06Q 50/00* (2012.01)
*H04N 21/47* (2011.01)
*H04N 21/431* (2011.01)
*H04N 21/242* (2011.01)
*H04N 21/4788* (2011.01)
*H04N 21/61* (2011.01)

(56) References Cited

U.S. PATENT DOCUMENTS

| | | | |
|---|---|---|---|
| 8,082,003 B2 | 12/2011 | Jee | |
| 8,250,616 B2 * | 8/2012 | Davis | H04N 7/17318 725/87 |
| 8,392,947 B2 * | 3/2013 | Grannan | H04N 5/44591 725/131 |
| 8,395,655 B2 | 3/2013 | Robinson et al. | |
| 8,564,618 B2 | 10/2013 | Ryu et al. | |
| 9,363,092 B2 * | 6/2016 | Crawley | H04L 12/1827 |
| 10,009,398 B2 * | 6/2018 | Tsarkova | H04N 21/21805 |
| 2002/0095689 A1 * | 7/2002 | Novak | H04N 21/64322 725/151 |
| 2006/0098085 A1 | 5/2006 | Nichols et al. | |
| 2006/0164508 A1 | 7/2006 | Eshkoli et al. | |
| 2007/0186177 A1 * | 8/2007 | Both | G06F 3/04817 715/764 |
| 2008/0016156 A1 | 1/2008 | Miceli et al. | |
| 2008/0065507 A1 | 3/2008 | Morrison et al. | |
| 2008/0174570 A1 | 7/2008 | Jobs et al. | |
| 2008/0239062 A1 | 10/2008 | Civanlar et al. | |
| 2008/0246851 A1 * | 10/2008 | Jung | H04N 5/44513 348/222.1 |
| 2009/0054107 A1 * | 2/2009 | Feland, III | G06F 3/04883 455/564 |
| 2010/0182248 A1 | 7/2010 | Chun | |
| 2010/0220172 A1 | 9/2010 | Michaelis | |
| 2010/0315484 A1 * | 12/2010 | Ramanathan | H04N 7/147 348/14.09 |
| 2010/0333004 A1 * | 12/2010 | Kristiansen | G06F 3/04883 715/765 |
| 2011/0145881 A1 * | 6/2011 | Hartman | H04N 7/15 725/118 |
| 2011/0157298 A1 | 6/2011 | Huang et al. | |
| 2011/0249073 A1 * | 10/2011 | Cranfill | G06F 3/0482 348/14.02 |
| 2011/0270923 A1 | 11/2011 | Jones et al. | |
| 2011/0286716 A1 | 11/2011 | Alderson | |
| 2012/0122590 A1 | 5/2012 | Nguyen | |
| 2012/0182384 A1 | 7/2012 | Anderson et al. | |
| 2012/0215380 A1 | 8/2012 | Fouillade et al. | |
| 2012/0262537 A1 | 10/2012 | Baker et al. | |
| 2012/0268553 A1 | 10/2012 | Talukder | |
| 2012/0290977 A1 | 11/2012 | Devecka | |
| 2013/0063542 A1 * | 3/2013 | Bhat | H04N 7/15 348/14.03 |
| 2013/0155099 A1 | 6/2013 | Ha et al. | |
| 2013/0194378 A1 | 8/2013 | Brown | |
| 2013/0198629 A1 * | 8/2013 | Tandon | H04M 3/567 715/716 |
| 2013/0205408 A1 * | 8/2013 | Yerli | H04L 63/10 726/28 |
| 2013/0208187 A1 | 8/2013 | Bhogal et al. | |
| 2013/0216206 A1 * | 8/2013 | Dubin | H04N 9/87 386/282 |
| 2013/0231185 A1 | 9/2013 | Steil | |
| 2013/0263021 A1 * | 10/2013 | Dunn | H04N 21/4532 715/756 |
| 2014/0036090 A1 | 2/2014 | Black et al. | |
| 2014/0253801 A1 * | 9/2014 | Richman | H04N 21/4312 348/564 |
| 2014/0267572 A1 * | 9/2014 | Bright-Thomas | H04N 19/30 348/14.09 |
| 2014/0368734 A1 | 12/2014 | Hoffert et al. | |
| 2015/0304605 A1 * | 10/2015 | Hartman | H04N 7/15 725/109 |

OTHER PUBLICATIONS

USPTO, Final Office Action mailed for U.S. Appl. No. 14/105,938, dated Apr. 7, 2016, 24 pages.

USPTO, Notice of Allowance mailed for U.S. Appl. No. 14/105,938, dated Dec. 9, 2016, 11 pages.

USPTO, Non-Final Office Action mailed for U.S. Appl. No. 14/105,938, dated Oct. 8, 2015, 19 pages.

* cited by examiner

SYNCHRONOUS COMMUNICATION

CROSS REFERENCE TO RELATED APPLICATIONS

This application is a continuation of U.S. application Ser. No. 14/105,938, filed Dec. 13, 2013. The entire disclosure of the above application is incorporated herein by reference.

BACKGROUND

This disclosure relates to synchronous communication sessions and, more particularly, to the broadcasting of synchronous communication sessions.

The Internet currently allows for the free exchange of ideas and information in a manner that was unimaginable only a couple of decades ago. One such use for the Internet is as a communication medium, whether it is via one-on-one exchanges or multi-party exchanges within social networks.

As is known in the art, social networks may allow for users to engage in a quasi-real-time, interactive dialogue. Included within social networks may be the ability to participate in video conferences, which are multiuser video chat rooms that allow for virtual gatherings of people so that they may chat about various topics. The Internet may provide users with the ability to broadcast (e.g., stream) these video conferences to a wide audience.

SUMMARY

In one implementation, a computer-implemented method includes receiving, using one or more computing devices, a discrete video stream from each of a plurality of users of a social network, resulting in a plurality of discrete video streams. A synchronous communication session is provided for the plurality of users based, at least in part, upon the plurality of discrete video streams. A first video stream of a first user of the plurality of users is rendered, for the plurality of users, within a primary viewing field associated with the synchronous communication session. The first video stream is chosen from the plurality of discrete video streams. A secondary viewing field that is associated with the synchronous communication session is rendered for the plurality of users and includes a plurality of portions. Video streams for the remaining users of the plurality of users are rendered, for the plurality of users, within the plurality of portions of the secondary viewing field. The video streams for the remaining users of the plurality of users are chosen from the plurality of discrete video streams. The plurality of discrete video streams are broadcast to one or more broadcast recipients. The one or more broadcast recipients are enabled to manipulate the manner in which the plurality of discrete video streams are rendered on one or more client electronic devices.

In another implementation, a computer-implemented method includes receiving, using one or more computing devices, a discrete video stream from each of a plurality of users of a social network, resulting in a plurality of discrete video streams. A synchronous communication session is provided for the plurality of users based, at least in part, upon the plurality of discrete video streams. The plurality of discrete video streams are broadcast to one or more broadcast recipients.

One or more of the following features may be included. The one or more broadcast recipients may be enabled to manipulate the manner in which the plurality of discrete video streams are rendered on one or more client electronic devices. Enabling the one or more broadcast recipients to manipulate the manner in which the plurality of discrete video streams are rendered may include providing one or more user-selectable rendering templates to the one or more client electronic devices, each of which defines a video stream rendering layout for one or more of the plurality of discrete video streams. The one or more user-selectable rendering templates may include one or more of: a statistical preference template; and a guest preference template. The plurality of discrete video streams may be prerecorded discrete video streams. A first video stream of a first user of the plurality of users may be rendered, for the plurality of users, within a primary viewing field associated with the synchronous communication session, wherein the first video stream is chosen from the plurality of discrete video streams. A secondary viewing field that is associated with the synchronous communication session may be rendered for the plurality of users and may include a plurality of portions. Video streams for the remaining users of the plurality of users may be rendered for the plurality of users within the plurality of portions of the secondary viewing field. The video streams for the remaining users of the plurality of users may be chosen from the plurality of discrete video streams. The first user of the plurality of users may be currently addressing the remaining users of the plurality of users within the synchronous communication session. A placeholder may be rendered for the first user within a first portion of the secondary viewing field while the first video stream is being rendered within the primary viewing field.

In another implementation, a computing system including a processor and memory is configured to perform operations including receiving, using one or more computing devices, a discrete video stream from each of a plurality of users of a social network, resulting in a plurality of discrete video streams. A synchronous communication session is provided for the plurality of users based, at least in part, upon the plurality of discrete video streams. The plurality of discrete video streams are broadcast to one or more broadcast recipients.

One or more of the following features may be included. The one or more broadcast recipients may be enabled to manipulate the manner in which the plurality of discrete video streams are rendered on one or more client electronic devices. Enabling the one or more broadcast recipients to manipulate the manner in which the plurality of discrete video streams are rendered may include providing one or more user-selectable rendering templates to the one or more client electronic devices, each of which defines a video stream rendering layout for one or more of the plurality of discrete video streams. The one or more user-selectable rendering templates may include one or more of: a statistical preference template; and a guest preference template. The plurality of discrete video streams may be prerecorded discrete video streams. A first video stream of a first user of the plurality of users may be rendered, for the plurality of users, within a primary viewing field associated with the synchronous communication session, wherein the first video stream is chosen from the plurality of discrete video streams. A secondary viewing field that is associated with the synchronous communication session may be rendered for the plurality of users and may include a plurality of portions. Video streams for the remaining users of the plurality of users may be rendered for the plurality of users within the plurality of portions of the secondary viewing field. The video streams for the remaining users of the plurality of users may be chosen from the plurality of discrete video streams. The first user of the plurality of users may be currently addressing the remaining users of the plurality of users within the synchronous communication session. A placeholder may be rendered for the first user within a first portion of the secondary viewing field while the first video stream is being rendered within the primary viewing field.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DESCRIPTION

Figure 1:
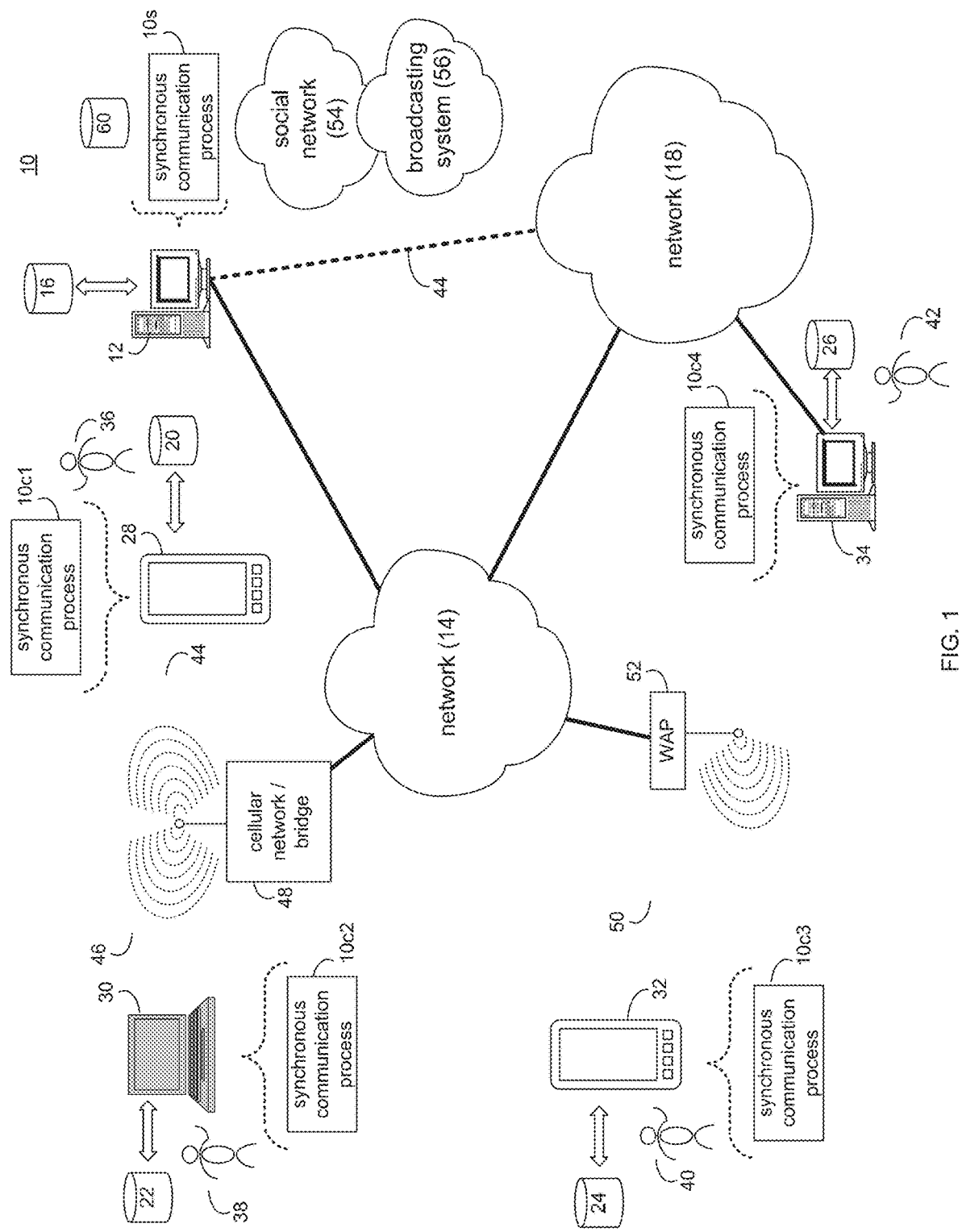
FIG. 1 is a diagrammatic view of a distributed computing network including a computing device that executes a synchronous communication process according to an embodiment of the present disclosure.
Figure 2:
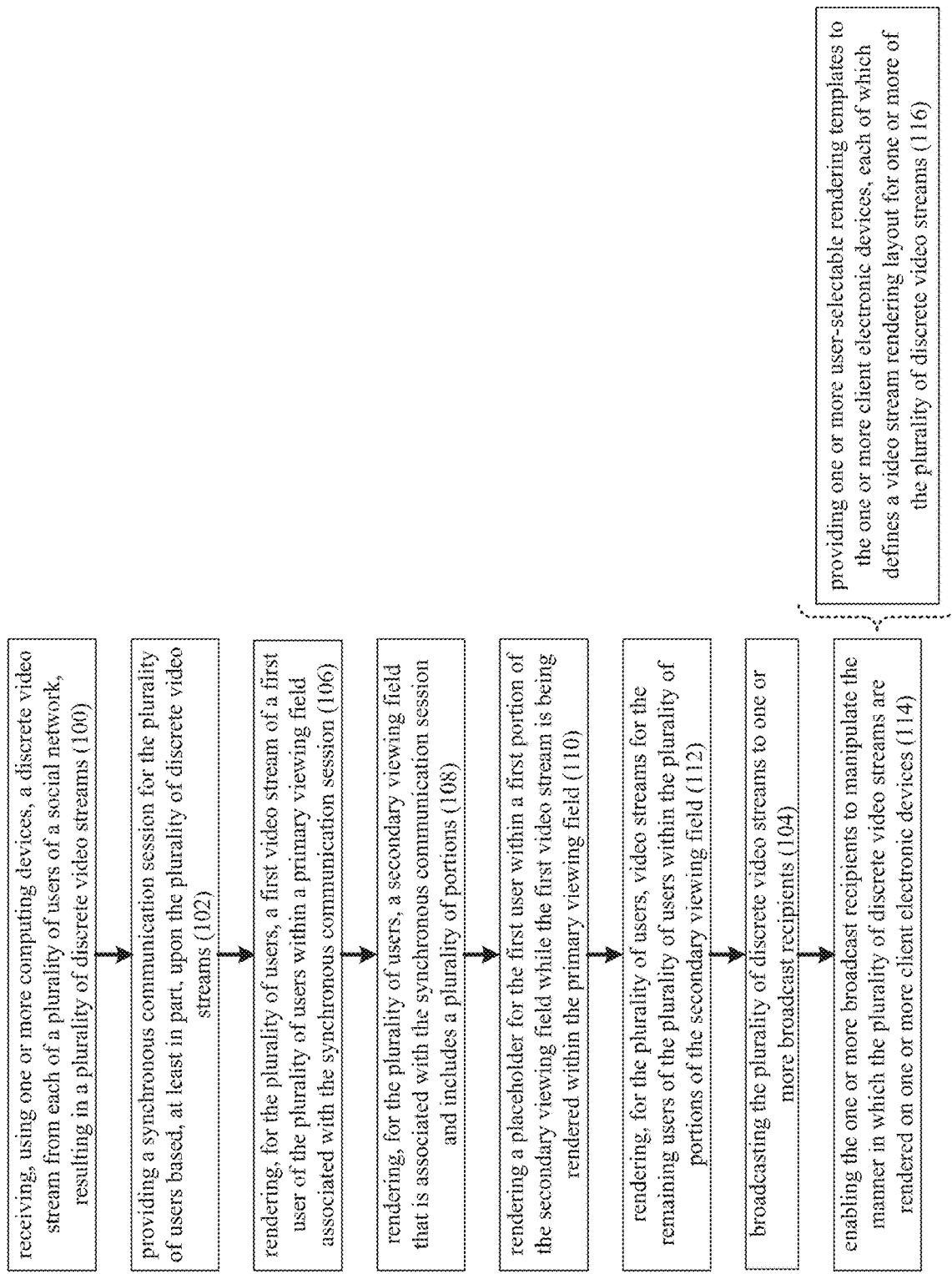
FIG. 2 is a flowchart of the synchronous communication process of FIG. 1 according to an embodiment of the present disclosure.

In FIGS. 1 & 2, there is shown synchronous communication process 10. Synchronous communication process 10 may be implemented as a server-side process, a client-side process, or a hybrid server-side/client-side process. For example, synchronous communication process 10 may be implemented as a purely server-side process via synchronous communication process 10s. Alternatively, synchronous communication process 10 may be implemented as a purely client-side process via one or more of synchronous communication process 10c1, synchronous communication process 10c2, synchronous communication process 10c3, and synchronous communication process 10c4. Alternatively still, synchronous communication process 10 may be implemented as a hybrid server-side/client-side process via synchronous communication process 10s in combination with one or more of synchronous communication process 10c1, synchronous communication process 10c2, synchronous communication process 10c3, and synchronous communication process 10c4. Accordingly, synchronous communication process 10 as used in this disclosure may include any combination of synchronous communication process 10s, synchronous communication process 10c1, synchronous communication process 10c2, synchronous communication process 10c3, and synchronous communication process 10c4.

As will be discussed below in greater detail, synchronous communication process 10 may receive 100 a discrete video stream from each of a plurality of users of a social network, resulting in a plurality of discrete video streams. A synchronous communication session may be provided 102 for the plurality of users based, at least in part, upon the plurality of discrete video streams. The plurality of discrete video streams may be broadcast 104 to one or more broadcast recipients Synchronous communication process 10s may be a server application and may reside on and may be executed by computing device 12, which may be connected to network 14 (e.g., the Internet or a local area network). Examples of computing device 12 may include, but are not limited to: a personal computer, a laptop computer, a tablet computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of synchronous communication process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of synchronous communication processes 10c1, 10c2, 10c3, 10c4 may include but are not limited to a web browser, a game console user interface, a social network user interface, or a specialized application. The instruction sets and subroutines of synchronous communication processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a tablet computer (not shown), a notebook computer (not shown), a server computer (not shown), a smart television (not shown), a gaming console (not shown), and a dedicated network device (not shown). Client electronic devices 28, 30, 32, 34 may each execute an operating system.

Users 36, 38, 40, 42 may access synchronous communication process 10 directly through network 14 or through secondary network 18. Further, synchronous communication process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP) 52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As is known in the art, users of social networks (e.g., social network 54) may be able to participate in group communication sessions, such as synchronous communication sessions (e.g., video conferences) that may allow for virtual gatherings of people so that they may chat about various topics.

Synchronous communication process 10 may be included within, executed within, or a portion of social network 54. Alternatively, synchronous communication process 10 may be included within, executed within, or a portion of Internet-based broadcasting system 56. Further, synchronous communication process 10 may be a stand-alone application that may be configured to interface with social network 54 and/or Internet-based broadcasting system 56. Additionally, Internet-based broadcasting system 56 may be included within, executed within, or a portion of social network 54.

Figure 3:
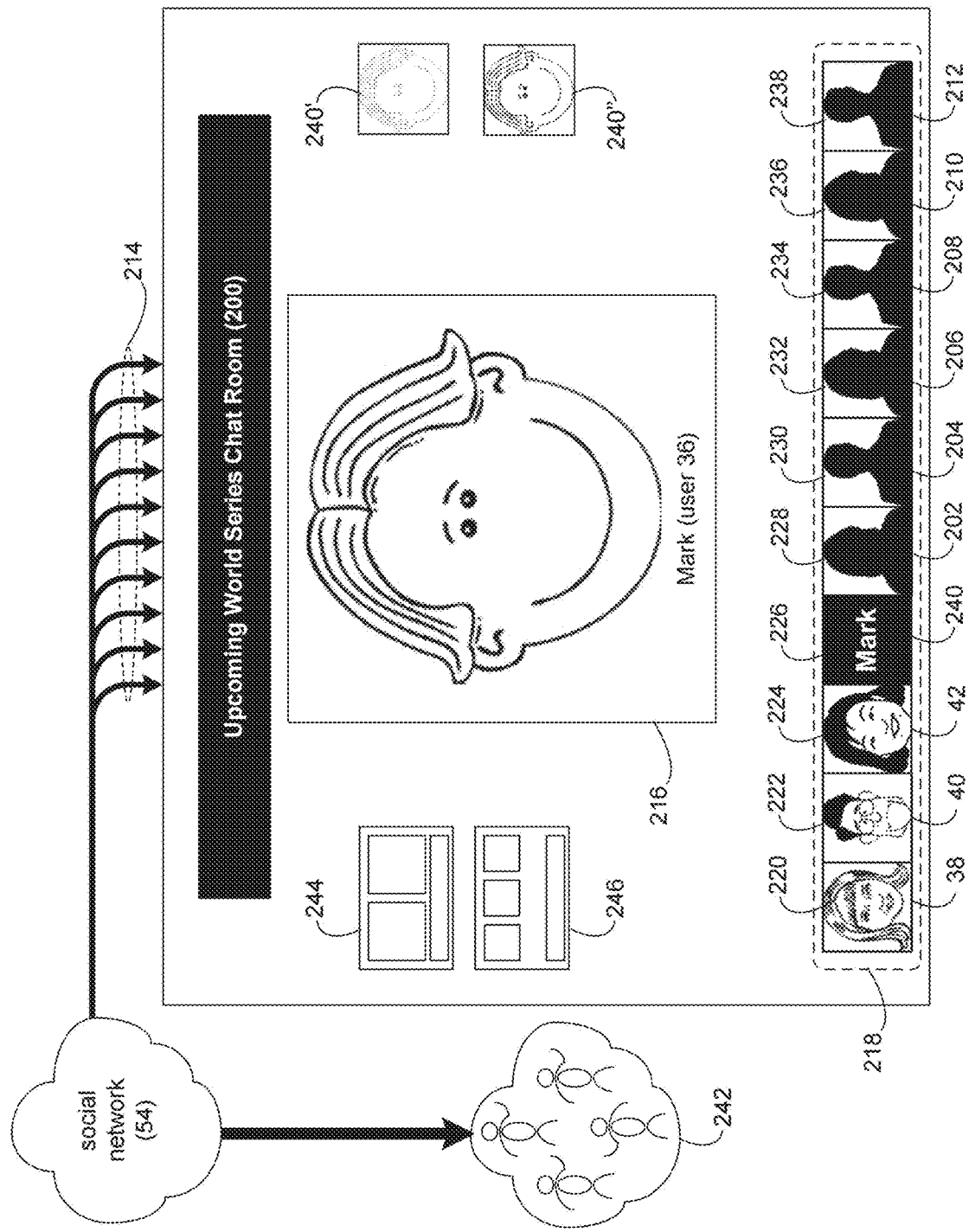
FIG. 3 is a diagrammatic view of a display screen rendered by the synchronous communication process of FIG. 1 according to an embodiment of the present disclosure.

Referring also to FIG. 3, assume for illustrative purposes that user 36 (i.e. Mark) is an avid baseball fan and is looking forward to the upcoming World Series, and that Mary (user 38), Joe (user 40), and Cindy (user 42) are also baseball fans. Further assume for illustrative purposes that user 36, 38, 40, 42 wish to participate in synchronous communication session 200 so that they may discuss the upcoming World Series. Accordingly and in this illustrative example, user 36 may utilize synchronous communication process 10 to effectuate such synchronous communication session 200.

While the following discussion concerns synchronous communication session 200 being an audio-video, synchronous communication session, this is for illustrative purposes only and is not intended to be a limitation of this disclosure, as other configurations are possible (e.g., a multi-user, video conference that includes one or more audio-only participants) and are considered to be within the scope of this disclosure.

Synchronous communication process 10 may provide synchronous communication session 200 for users 36, 38, 40, 42. Assume for illustrative purposes that additional users are also participating in synchronous communication session 200, namely users 202, 204, 206, 208, 210, 212.

Accordingly, synchronous communication process 10 may receive 100 a discrete video stream from each of a plurality of users (e.g., users 36, 38, 40, 42, 202, 204, 206, 208, 210, 212) of social network 54, resulting in a plurality of discrete video streams (e.g., discrete video streams 214). Synchronous communication process 10 may provide 102 synchronous communication session 200 for the plurality of users (e.g., users 36, 38, 40, 42, 202, 204, 206, 208, 210, 212) based, at least in part, upon the plurality of discrete video streams (e.g., discrete video streams 214).

Synchronous communication process 10 may be configured to provide visual prominence to the user that is currently speaking within synchronous communication session 200. Assume for illustrative purposes that when synchronous communication session 200 is started, user 36 leads off the discussion concerning the upcoming World Series. Accordingly, synchronous communication process 10 may provide visual prominence to user 36, as user 36 is currently addressing the remaining users (e.g., users 38, 40, 42, 202, 204, 206, 208, 210, 212) of the plurality of users within synchronous communication session 200.

Accordingly, synchronous communication process 10 may render 106, for the plurality of users (e.g., users 36, 38, 40, 42, 202, 204, 206, 208, 210, 212), a first video stream of a first user (e.g., user 36) of the plurality of users (e.g., users 36, 38, 40, 42, 202, 204, 206, 208, 210, 212) within a primary viewing field (e.g., primary viewing field 216) associated with synchronous communication session 200. This first video stream may be chosen from the plurality of discrete video streams (e.g., discrete video streams 214) and may be the video stream received from (in this example) data-enabled, cellular telephone 28 (which is associated with user 36). Whenever one of the other users (e.g., users 38, 40, 42, 202, 204, 206, 208, 210, 212) speaks within synchronous communication session 200, synchronous communication process 10 may be configured to automatically position the video stream associated with the speaking user within primary viewing field 216.

Synchronous communication process 10 may render 108, for the plurality of users (e.g., users 36, 38, 40, 42, 202, 204, 206, 208, 210, 212), a secondary viewing field (e.g., secondary viewing field 218) that is associated with synchronous communication session 200, which may include a plurality of portions (e.g., one for each of the participants of synchronous communication session 200). While in this particular example, secondary viewing field 218 is shown to include ten portions (namely portions 220, 222, 224, 226, 228, 230, 232, 234, 236, 238), this is for illustrative purposes only and is not intended to be a limitation of this disclosure, as other configurations are possible and are considered to be within the scope of this disclosure. Specifically, the quantity of portions included within secondary viewing field 218 may be increased/decreased depending upon the number of users participating in synchronous communication session 200.

Since social network 54 may provide visual prominence to the user that is currently addressing the remaining users within synchronous communication session 200, primary viewing field 216 may be larger than each of the plurality of portions (namely portions 220, 222, 224, 226, 228, 230, 232, 234, 236, 238) included within secondary viewing field 218.

Synchronous communication process 10 may render 110 a placeholder (e.g., placeholder 240) for the first user (e.g., user 36 who is currently speaking) within a first portion (e.g., portion 226) of secondary viewing field 218 while the above-described first video stream (e.g., the video stream received from data-enabled, cellular telephone 28 that is associated with user 36) is being rendered within primary viewing field 216.

Placeholder 240 for the first user (e.g., user 36) of the plurality of users (e.g., users 36, 38, 40, 42, 202, 204, 206, 208, 210, 212) may include information concerning the first user (e.g., user 36). Examples of such information may include but is not limited to one or more of: identification information for the first user (e.g., user 36), such as name and title; and/or contact information for the first user (e.g., user 36), such as an email address, a mailing address, a home phone number, an office phone number, a cell phone number, a social network user name, or a webpage.

Alternatively, placeholder 240 for the first user (e.g., user 36) of the plurality of users (e.g., users 36, 38, 40, 42, 202, 204, 206, 208, 210, 212) may include a partially-obscured, reduced-scale version of the video stream of the first user (e.g., user 36). An example of such a partially-obscured, reduced-scale version of the video stream of user 36 may include but is not limited to a grayed-out version (e.g., alternate placeholder 240') of the video stream of user 36.

Alternatively still, placeholder 240 for the first user (e.g., user 36) of the plurality of users (e.g., users 36, 38, 40, 42, 202, 204, 206, 208, 210, 212) may include a reduced-scale version of the video stream of the first user (e.g., user 36). An example of such a reduced-scale version of the video stream of user 36 may include but is not limited to a smaller version (e.g., alternate placeholder 240") of the video stream of user 36.

Synchronous communication process 10 may render 112, for the plurality of users (e.g., users 36, 38, 40, 42, 202, 204, 206, 208, 210, 212), video streams for the remaining users of the plurality of users (e.g., users 38, 40, 42, 202, 204, 206, 208, 210, 212) within the plurality of portions of the secondary viewing field. The video streams for the remaining users of the plurality of users (e.g., users 38, 40, 42, 202, 204, 206, 208, 210, 212) may be chosen from the plurality of discrete video streams (e.g., discrete video streams 214).

Specifically: a video stream for user 38 may be rendered within portion 220 of secondary viewing field 218; a video stream for user 40 may be rendered within portion 222 of secondary viewing field 218; a video stream for user 42 may be rendered within portion 224 of secondary viewing field 218; a video stream for user 202 may be rendered within portion 228 of secondary viewing field 218; a video stream for user 204 may be rendered within portion 230 of secondary viewing field 218; a video stream for user 206 may be rendered within portion 232 of secondary viewing field 218; a video stream for user 208 may be rendered within portion 234 of secondary viewing field 218; a video stream for user 210 may be rendered within portion 236 of secondary viewing field 218; and a video stream for user 212 may be rendered within portion 238 of secondary viewing field 218.

As discussed above, whenever one of the users (e.g., users 36, 38, 40, 42, 202, 204, 206, 208, 210, 212) speaks within synchronous communication session 200, synchronous communication process 10 may be configured to automatically position the video stream associated with the speaking user within primary viewing field 216. Additionally, synchronous communication process 10 may be configured to allow the participants (e.g., users 36, 38, 40, 42, 202, 204, 206, 208, 210, 212) of synchronous communication session 200 to select e.g., which video stream appears within primary viewing field 216. For example, if user 40 wanted the video stream associated with user 38 to appear primary viewing field 216, user 40 may select (via e.g., an on-screen pointer or a finger tap) portion 220 of secondary viewing field 218 (i.e., the portion associated with user 38) and synchronous communication process 10 may render the video stream associated with user 38 within primary viewing field 216.

As discussed above and in this example, a plurality of users (e.g., users 36, 38, 40, 42, 202, 204, 206, 208, 210, 212) may participate within synchronous communication session 200, wherein a video stream associated with each of these users is rendered (by synchronous communication process 10) within either (in this example) primary viewing field 216 or the various portions (e.g., portions 220, 222, 224, 226, 228, 230, 232, 234, 236, 238) included within secondary viewing field 218. Synchronous communication process 10 (alone or in combination with social network 54 and/or Internet-based broadcasting system 56) may broadcast the video stream visible within primary viewing field 216 to plurality of broadcast recipients 242. Through the use of the above-described Internet broadcasting, the content of synchronous communication session 200 may be provided to a much greater number of people than e.g., the ten participants (e.g., users 36, 38, 40, 42, 202, 204, 206, 208, 210, 212) of synchronous communication session 200. Accordingly, if synchronous communication session 200 involves e.g., a celebrity or a world leader, the content of synchronous communication session 200 may be broadcast to millions of people.

Additionally, synchronous communication process 10 (alone or in combination with social network 54 and/or Internet-based broadcasting system 56) may be configured to broadcast 104 the plurality of discrete video streams (e.g., discrete video streams 214) to broadcast recipients 242, Specifically, synchronous communication process 10 (alone or in combination with social network 54 and/or Internet-based broadcasting system 56) may broadcast 104 all of the video streams visible within primary viewing field 216 and the secondary viewing field 218 to plurality of broadcast recipients 242.

Accordingly and when configured in such a fashion, synchronous communication process 10 may enable 114 broadcast recipients 242 to manipulate the manner in which the plurality of discrete video streams (e.g., discrete video streams 214) are rendered on the client electronic devices associated with broadcast recipients 242. For example, synchronous communication process 10 may be configured to allow broadcast recipients 242 of synchronous communication session 200 to select e.g., which video stream appears within primary viewing field 216 of synchronous communication session 200, as the plurality of discrete video streams (e.g., discrete video streams 214) are provided to broadcast recipients 242. For example, if a broadcast recipient wanted the video stream associated with user 42 to appear within primary viewing field 216 (as opposed to user 36), the broadcast recipient may select (via e.g., an on-screen pointer or a finger tap) portion 224 of secondary viewing field 218 (i.e., the portion associated with user 42) and synchronous communication process 10 may render the video stream associated with user 42 within primary viewing field 216.

When enabling 114 the broadcast recipients 242 to manipulate the manner in which the plurality of discrete video streams are rendered, synchronous communication process 10 may provide 116 one or more user-selectable rendering templates (e.g., templates 244, 246) to the client electronic devices associated with broadcast recipients 242. Templates 244, 246 may be configured to define a video stream rendering layout for one or more of the plurality of discrete video streams (e.g., discrete video streams 214). For example, template 244 is shown to define a video stream rendering layout that includes two primary viewing fields; and template 246 is shown to define a video stream rendering layout that includes three primary viewing fields. Accordingly and through synchronous communication process 10, the broadcast recipients 242 may individual choose to select one or more the these user-selectable rendering templates (e.g., templates 244, 246) to configure the manner in which the plurality of discrete video streams (e.g., discrete video streams 214) are displayed within synchronous communication session 200.

Examples of the user-selectable rendering templates (e.g., templates 244, 246) may include but are not limited to a statistical preference template and a guest preference template. An example of a statistical preference template may include a rendering template that defines that most popular manner in which the plurality of discrete video streams (e.g., discrete video streams 214) are being displayed within synchronous communication session 200 by broadcast recipients 242. An example of a guest preference template may include a rendering template that defines the manner in which the plurality of discrete video streams (e.g., discrete video streams 214) are being displayed by a special guest (e.g., a celebrity, a politician, a religious leader) of synchronous communication session 200.

While the previous discussion concerns the plurality of discrete video streams (e.g., discrete video streams 214) being broadcast 104 in real time (at the time of synchronous communication session 200), synchronous communication process 10 may be configured to allow the plurality of discrete video streams (e.g., discrete video streams 214) to be prerecorded and broadcast 104 at a later date/time (e.g., after synchronous communication session 200 has ended).

Figure 4:
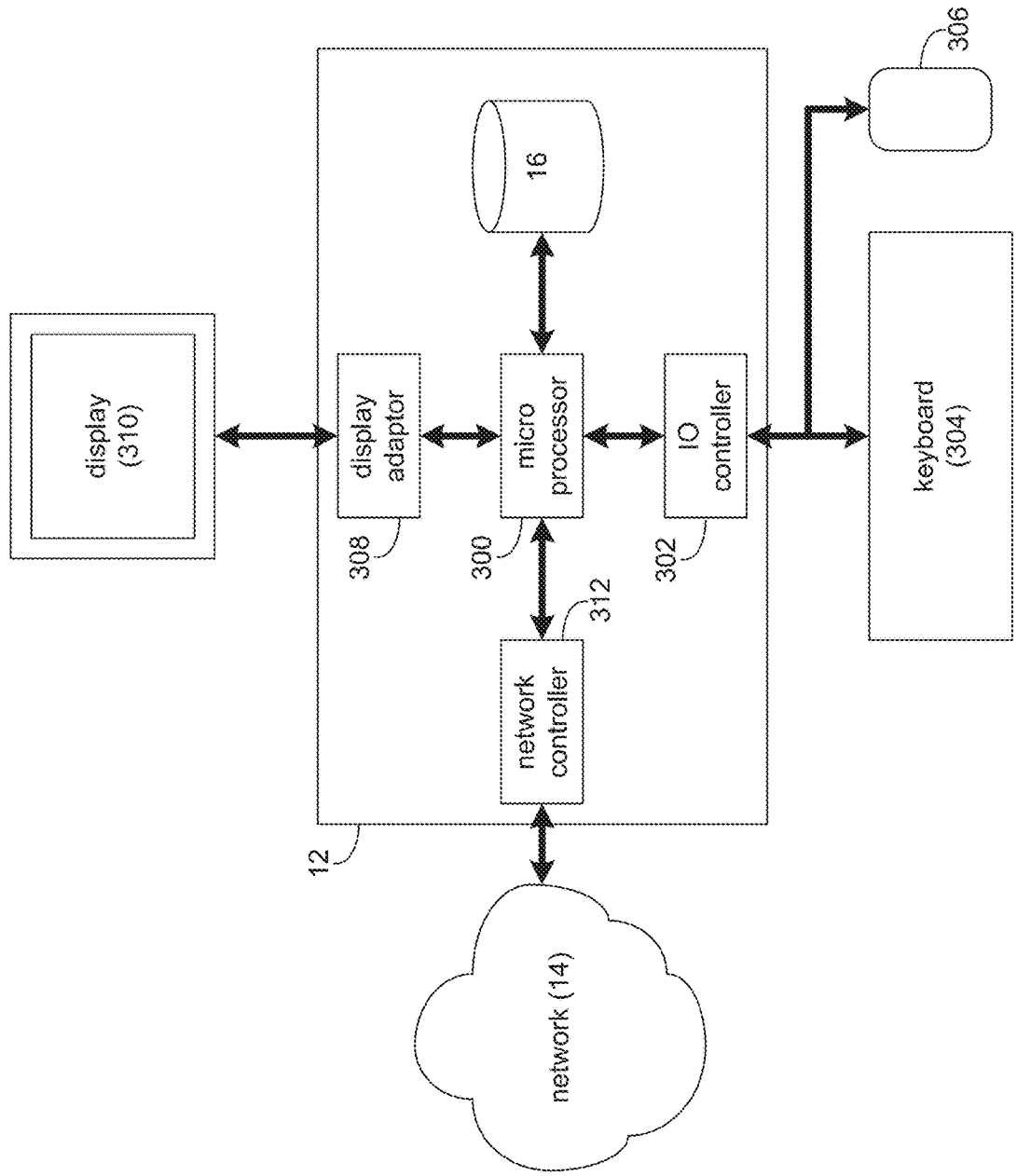
FIG. 4 is a diagrammatic view of the computing device of FIG. 1 according to an embodiment of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, synchronous communication process 10 may be substituted for computing device 12 within FIG. 4, examples of which may include but are not limited to client electronic devices 28, 30, 32, 34.

Computing system 12 may include microprocessor 300 configured to e.g., process data and execute instructions/code for synchronous communication process 10. Microprocessor 300 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 302 may be configured to couple microprocessor 300 with various devices, such as keyboard 304, mouse 306, USB ports (not shown), and printer ports (not shown). Display adaptor 308 may be configured to couple display 310 (e.g., a CRT or LCD monitor) with microprocessor 300, while network adapter 312 (e.g., an Ethernet adapter) may be configured to couple microprocessor 300 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 300) of a general purpose computer/special purpose computer/other programmable data processing apparatus (e.g., computing device 12), such that the instructions, which execute via the processor (e.g., processor 300) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having described the disclosure of the present application in detail and by reference to embodiments thereof, it will be apparent that modifications and variations are possible without departing from the scope of the disclosure defined in the appended claims.

What is claimed is:

1. A computer-implemented method comprising:
receiving, using one or more synchronous communication computing devices, a plurality of discrete video streams from respective participating user computing devices of participating users that participate in a synchronous communication session;
providing the synchronous communication session for the respective user computing devices to display the plurality of discrete video streams;
rendering, for the respective user computing devices, a first video stream of the plurality of discrete video streams within a primary viewing field associated with the synchronous communication session, wherein the first video stream is from a first participating user computing device of the respective participating user computing devices;
rendering, for the respective participating user computing devices, a secondary viewing field that is associated with the synchronous communication session and includes a plurality of portions;
rendering, for the respective participating user computing devices, select video streams of the plurality of the discrete video streams within the plurality of portions of the secondary viewing field;
broadcasting the plurality of discrete video streams of the participating users, by a broadcasting system that interfaces with one or more synchronous communication computing devices of respective non-participating user computing devices of non-participating broadcast users that receive broadcasts from the broadcasting system, wherein the respective synchronous communication computing devices of the non-participating broadcast users do not participate in the synchronous communication session, and wherein the synchronous communication computing devices that receive broadcasts are different from the synchronous communication computing devices;
providing one or more templates to each of the respective non-participating user computing devices to enable each of the non-participating broadcast users to select a particular template from the one or more templates;
enabling the non-participating broadcast users to individually select video streams to be rendered within a portion of a plurality of fields on the respective non-participating user computing devices, according to the particular template; and
wherein at least one of the one or more templates defines the primary viewing field and the plurality of portions of the secondary viewing field, and wherein at least a portion of the plurality of portions of the secondary viewing field includes a placeholder for display of the first video stream being shown in the primary field in a reduced-scale version, during rendering in real time of the first video stream in the primary field.

2. The computer-implemented method of claim 1, wherein at least one of the one or more templates defines at least one of a number or a location of the primary viewing field.

3. The computer-implemented method of claim 2, wherein the at least one of the one or more templates defines at least one of a number or a location of the plurality of portions of the secondary viewing field.

4. The computer-implemented method of claim 1, further comprising enabling the non-participating broadcast users to select the first video stream for the primary viewing field.

5. The computer-implemented method of claim 4, wherein selecting the first video stream for the primary viewing field is by a user of the non-participating broadcast users directing a pointer to, or tapping onto the first video stream currently being displayed in a first portion of the plurality of portions of the secondary viewing field.

6. The computer-implemented method of claim 1, wherein the one or more templates include a representative manner in which the discrete video streams are being displayed by a particular non-participating broadcast user, or a majority of the other non-participating broadcast users.

7. A non-transitory machine-readable medium embodying instructions, which when executed by one or more processors, cause the one or more processors to perform operations, the operations comprising:
receiving a plurality of discrete video streams from respective participating user computing devices of participating users that participate in a synchronous communication session;
providing the synchronous communication session for the respective participating user computing devices to display the plurality of discrete video streams;
rendering, for the respective participating user computing devices, a first video stream of a first user of the participating users within a primary viewing field associated with the synchronous communication session;
rendering, for the respective participating user computing devices, a secondary viewing field that is associated with the synchronous communication session and includes a plurality of portions;
rendering, for the respective participating user computing devices, a first video stream of the plurality of discrete video streams within a primary viewing field associated with the synchronous communication session, wherein the first video stream is from a first participating user computing device of the respective participating user computing devices;
broadcasting the plurality of discrete video streams of the participating users to respective user computing devices of non-participating broadcast users that receive broadcasts of the discrete video streams, wherein the respective user computing devices of the non-participating broadcast users do not participate in the synchronous communication session, and wherein the non-participating broadcast users that receive broadcasts are different from the participating users;
providing one or more templates to each of the respective user computing devices of the non-participating broadcast users to enable each of the non-participating broadcast users to select a particular template from the one or more templates; and
enabling the non-participating broadcast users to individually select video streams to be rendered within a portion of a plurality of fields on the respective non-participating user computing devices, according the particular template; and
wherein at least one of the one or more templates defines the primary viewing field and the plurality of portions of the secondary viewing field, and wherein at least a portion of the plurality of portions of the secondary viewing field includes a placeholder for display of the first video stream being shown in the primary field in a reduced-scale version, during rendering in real time of the first video stream in the primary field.

8. The non-transitory machine-readable medium of claim 7, wherein at least one of the one or more templates defines at least one of a number or a location of one or more primary viewing fields.

9. The non-transitory machine-readable medium of claim 8, wherein at least one of the one or more templates defines at least one of a number or a location of the plurality of portions of the secondary viewing field.

10. The non-transitory machine-readable medium of claim 7, wherein the operations further comprise enabling the non-participating broadcast users to select the first video stream for the primary viewing field.

11. The non-transitory machine-readable medium of claim 10, wherein selecting the first video stream for the primary viewing field is by the a user in the non-participating broadcast users directing a pointer to, or tapping onto the first video stream currently being displayed in a first portion of the plurality of portions of the secondary viewing field.

12. The non-transitory machine-readable medium of claim 7, wherein the plurality of discrete video streams are broadcasted in real time.

13. A computing system including a processor and a memory, the computing system configured to perform operations comprising:
receiving, using one or more synchronous communication computing devices, a plurality of discrete video streams from respective user computing devices of a first set of participating users that participate in synchronous communication session;
providing the synchronous communication session for the respective user computing devices to display the plurality of discrete video streams;
rendering, for the respective user computing devices, a first video stream of a first user of the first set of participating users within a primary viewing field associated with the synchronous communication session;
rendering, for the respective user computing devices, a secondary viewing field that is associated with the synchronous communication session and includes a plurality of portions;
rendering, for the respective user computing devices, a first video stream of the plurality of discrete video streams within a primary viewing field associated with the synchronous communication session, wherein the first video stream is from a first user computing device of the respective user computing devices;
broadcasting the plurality of discrete video streams of the first set of participating users by a broadcasting system that interfaces with the one or more synchronous communication computing devices to respective user computing devices of non-participating broadcast users that receive broadcasts from the broadcasting system, wherein the respective user computing devices of the non-participating broadcast users do not participate in the synchronous communication session, and wherein the non-participating broadcast users that receive broadcasts are different from the first set of participating users;
providing one or more templates to each of the respective non-participating user computing devices to enable each of the broadcast users to select a particular template from the one or more templates; and
enabling the non-participating broadcast users to individually select video streams to be rendered within a portion of a plurality of fields on the respective non-participating user computing devices, according to the particular template; and wherein at least one of the one or more templates defines the primary viewing field and the plurality of portions of the secondary viewing field, and wherein at least a portion of the plurality of portions of the secondary viewing field includes a placeholder for display of the first video stream being shown in the primary field in a reduced-scale version, during rendering in real time of the first video stream in the primary field.

14. The computing system of claim 13, wherein at least one of the one or more templates defines at least one of a number or a location of one or more primary viewing fields.

15. The computing system of claim 14, wherein at least one of the one or more templates defines at least one of a number or a location of the plurality of portions of the secondary viewing field.

16. The computing system of claim 13, wherein the operations further comprise enabling the non-participating broadcast users to select the first video stream for the primary viewing field.

17. The computing system of claim 16, wherein selecting the first video stream for the primary viewing field is by the a user in the non-participating broadcast users directing a pointer to, or tapping onto the first video stream currently being displayed in a first portion of the plurality of portions of the secondary viewing field.

* * * * *